(12) United States Patent
Bellamy, III et al.

(10) Patent No.: US 8,494,997 B2
(45) Date of Patent: Jul. 23, 2013

(54) SYSTEM AND METHOD FOR VALIDATION OF TRANSACTION DATA

(76) Inventors: Samuel W. Bellamy, III, Bryn Mawr, PA (US); Christopher R. Kronenthal, Penn Valley, PA (US); Stephen M. Oberholtzer, King of Prussia, PA (US)

( * ) Notice: Subject to any disclaimer, the term of this patent is extended or adjusted under 35 U.S.C. 154(b) by 260 days.

(21) Appl. No.: 13/186,465

(22) Filed: Jul. 19, 2011

(65) Prior Publication Data

US 2011/0276531 A1 Nov. 10, 2011

Related U.S. Application Data

(60) Provisional application No. 61/366,104, filed on Jul. 20, 2010, provisional application No. 61/366,108, filed on Jul. 20, 2010, provisional application No. 61/366,111, filed on Jul. 20, 2010.

(51) Int. Cl.
*G06N 5/02* (2006.01)

(52) U.S. Cl.
USPC ............................................. 706/47; 705/44

(58) Field of Classification Search
USPC ..................................... 706/47–48; 705/2–39
See application file for complete search history.

(56) References Cited

U.S. PATENT DOCUMENTS

| | | | |
|---|---|---|---|
| 6,560,592 B1 | 5/2003 | Reid et al. | |
| 6,993,514 B2 * | 1/2006 | Majoor | 706/47 |
| 7,603,358 B1 * | 10/2009 | Anderson et al. | 1/1 |
| 7,873,560 B2 | 1/2011 | Reich et al. | |
| 7,958,077 B2 | 6/2011 | Vescovi et al. | |
| 2003/0158811 A1 * | 8/2003 | Sanders et al. | 705/39 |
| 2004/0034848 A1 * | 2/2004 | Moore et al. | 717/117 |
| 2007/0016450 A1 * | 1/2007 | Bhora et al. | 705/3 |
| 2009/0112765 A1 * | 4/2009 | Skowronek | 705/44 |
| 2009/0171778 A1 * | 7/2009 | Powell | 705/14 |
| 2009/0271214 A1 | 10/2009 | Kandasamy et al. | |
| 2010/0250338 A1 * | 9/2010 | Banerjee et al. | 705/10 |
| 2010/0301114 A1 * | 12/2010 | Lo Faro et al. | 235/380 |
| 2011/0258117 A1 * | 10/2011 | Ahmad et al. | 705/44 |

\* cited by examiner

*Primary Examiner* — Jeffrey A Gaffin
*Assistant Examiner* — Dave Misir

(57) ABSTRACT

A system and a method for validation of transaction data are disclosed. A rules engine in the system and the method is used to quickly and accurately deduce whether or not a transaction is a candidate for flagging with additional identification data, and a loyalty engine is used to quickly and accurately track and manage an entity relating to a transaction. In the system and the method, through compression and optimization, separate logical rules originally built are combined into an aggregate of compressed rules shared across a plurality of validations, such that the aggregate of compressed rules in the rules engine and the loyalty engine operates in memories of computing machines hosting servers. The system creates modularity and nimbleness with an internal instancing system and a dynamic routing node to multiple active instances. The multiple active instances of the rules engine and the loyalty engine support real-time updates and thus facilitate higher uptime capacities.

16 Claims, 3 Drawing Sheets

SYSTEM AND METHOD FOR VALIDATION OF TRANSACTION DATA

CROSS REFERENCE TO RELATED APPLICATIONS

This application claims benefit from U.S. Provisional Patent Applications Nos. 61/366,104, 61/366,108, and 61/366,111 filed on Jul. 20, 2010, which are hereby incorporated by reference.

FIELD OF THE INVENTION

The present invention relates to systems and methods for validation of transaction data using rules engines and loyalty engines.

BACKGROUND OF THE INVENTION

In systems for validation of transaction data, a principal functionality of a rules engine is to quickly and accurately deduce whether or not a transaction is a candidate for flagging with additional identification data, and a principal functionality of a loyalty engine is to quickly and accurately track and manage entities relating to transactions. The functionalities are born out of validations by the rules engine and/or loyalty engine based on certain rules therein. Such functionalities are overly processor and memory intensive; therefore, the validations in previous rules engines and loyalty engines are done after the fact of a transaction, and applied to the original transaction data in a retroactive fashion. Alternatively, in order to compensate for the overhead, the validations in previous rules engines and loyalty engines are non-dynamic and with limited scope and function for practical use in real-time environment.

U.S. Pat. No. 6,560,592 B1 (Reid et al., 2003) discloses a multi-model computer database storage system with a integrated rules engine. In the system, rule-sets are stored in either a database or externally. U.S. Pat. No. 7,958,077 B2 (Vescovi, 2011) discloses a rules engine, in which data and programming instructions to perform functions in the rules engine are stored in mass storage. U.S. Pat. No. 7,873,560 discloses an automated transaction compliance processing system comprising a rules engine, which is connected to a rules database or other storage area containing predefined rules. All rules engines in these disclosures rely on rule-sets in external storage media instead of system memory; therefore, the rules engines in these disclosures are non-dynamic, and lack high volume and real-time capacity. US Pat. Pub. No. 20090271214 A1 (Kandasamy et al., 2009) discloses a rule engine for a health care information system. In this disclosure, the rules from a rules repository are precompiled into a binary format for run-time execution and then the compiled rules with a single rules engine are situated on a process server which is accessed by workstations. But, the rules are not compressed and optimized; therefore, the disclosure does not solve the problems in previous rules engines.

In order to create a level of modularity and nimbleness of a rules engine or a loyalty engine, it is not practical to host all active rules within the same compiled instance of the rules engine or the loyalty engine. Even with benefits provided by a compressed and optimized version, a single all-encompassing instance to service all clients' needs is not viable. In previous disclosures, rules engines or loyalty engines lack the modularity and nimbleness.

With performance sensitive software systems, such as rules engines and loyalty engines, a major constraint is hardware environment. It becomes significantly more expensive to build hardware with enterprise-level amounts of random access memory (RAM) or other similar equipment for supporting a completely cached version of a single all-encompassing instance. No previous disclosures provide solutions for this problem.

Another problem in previous validation systems for transaction data is that rules engines and/or loyalty engines do not support real-time updates. Traditionally, an outdated rules engine or loyalty engine is completely removed from a validation system before an updated one can be put into the system. Therefore, without the environment of real-time updates, the uptime capacity of the validation systems is low.

SUMMARY OF THE INVENTION

The present invention discloses a system and a method for validation of transaction data using multiple active instances of a rules engine and a loyalty engine. The rules engine provides end-user clients with the ability to define and subsequently configure rules within the system. The rules are geared towards transaction data passed into the rules engine, and are used to flag certain elements of the transaction data when it passes a rules validation. In the present invention, the rules engine is capable of allowing myriad configurations and implementations of the system. The loyalty engine in the system is a mechanism that tracks and subsequently manages entities whom transaction data relates to. The mechanism is implemented through a series of rules and other means that produce a measurable outcome of altered behavior. In the present invention, the loyalty engine uses a second derivative of transaction quantity with respect to time as a measurement of the dynamics of loyalty programs.

The rules engine and/or the loyalty engine in the present invention employ a unique methodology of data compression and re-use of rules; therefore, very complex rule sets can be used in real-time environment, and instant feedback of outcomes can be given to external systems. In this present invention, rules in the rules engine and/or the loyalty engine are built and configured in a separate staging component, and then this environment is compiled into compressed and optimized versions that are exposed to the external systems relying on the rules. Through the compression and optimization, separate logical rules originally built are combined into an aggregate of rules shared across several different validations for any given transaction. The unique methodology in this present invention makes the whole of the generation of the rules engine and/or the loyalty engine feasible for commitment to a system's memory, which can be accessed substantially faster than a hard drive or a storage disk. That the whole of the rules engine and/or the loyalty engine are within system memory/cache furnishes high performance of the validation system. With a cache hit ratio of 99.5% or higher, the rules engine and/or the loyalty engine can easily service several millions of indexed items, referenced within the rules themselves, on a cost-effective hardware platform. As a result, the unique methodology enhances exponentially the scalability, speed, and cost effectiveness of the rules engine and/or the loyalty engine.

The present invention creates modularity and nimbleness of the rules engine and/or the loyalty engine with an internal instancing system supporting multiple active instances of the rules engine and/or the loyalty engine. As pointed out earlier in this document, supporting a completely cached version of a single all-encompassing instance requires a great amount of random access memory (RAM) and hence is significantly more expensive. In the present invention, the completely cached version of a single all-encompassing instance is essentially fragmented into multiple active instances. By using the environment of multiple active instances, with a dynamic multi-threaded routing node at the head of the rules engine and/or the loyalty engine, the multiple instances can be distributed over several systems and hardware configurations. Therefore, the present invention reduces hardware costs and simultaneously eliminates a potential single point of failure or a bottleneck of the system for validation of transaction data.

The multiple active instances of the rules engine and/or the loyalty engine support real-time updates in the environment and thus facilitate higher uptime capabilities from client's perspective. In traditional rules engines and loyalty engines, an outdated instance must be wiped out before a new instance can be put into place. The present invention is capable of having an outdated instance continue to service incoming requests for validation while an updated instance is compressed and compiled for future usage. When it is the time the updated instance is ready for use, the routing node is notified and begins sending transactions to the updated instance. Simultaneously, the outdated instance can continue to service any open transactions with it until the updated instance is responsible for all transactions. Then, the outdated instance can be removed from the environment of the multiple active instances.

In the present invention, the routing node contains all necessary criteria for determining which instance of the rules a particular transaction is routed to. The criteria include performance data on each particular instance (for best path routing), preconfigured settings for a given client submitting the transaction, as well as components that can be setup to look for particular data within the transaction to determine which instance the transaction should be routed to. By combining the routing node with the ability to support multiple active instances of the rules, the scenario is capable of being setup and executed, whereby the most actively triggered rules are positioned upon the most robust hardware systems and less active rules can be positioned on more cost effective hardware.

DETAILED DESCRIPTION OF EXEMPLARY EMBODIMENTS

Figure 1:
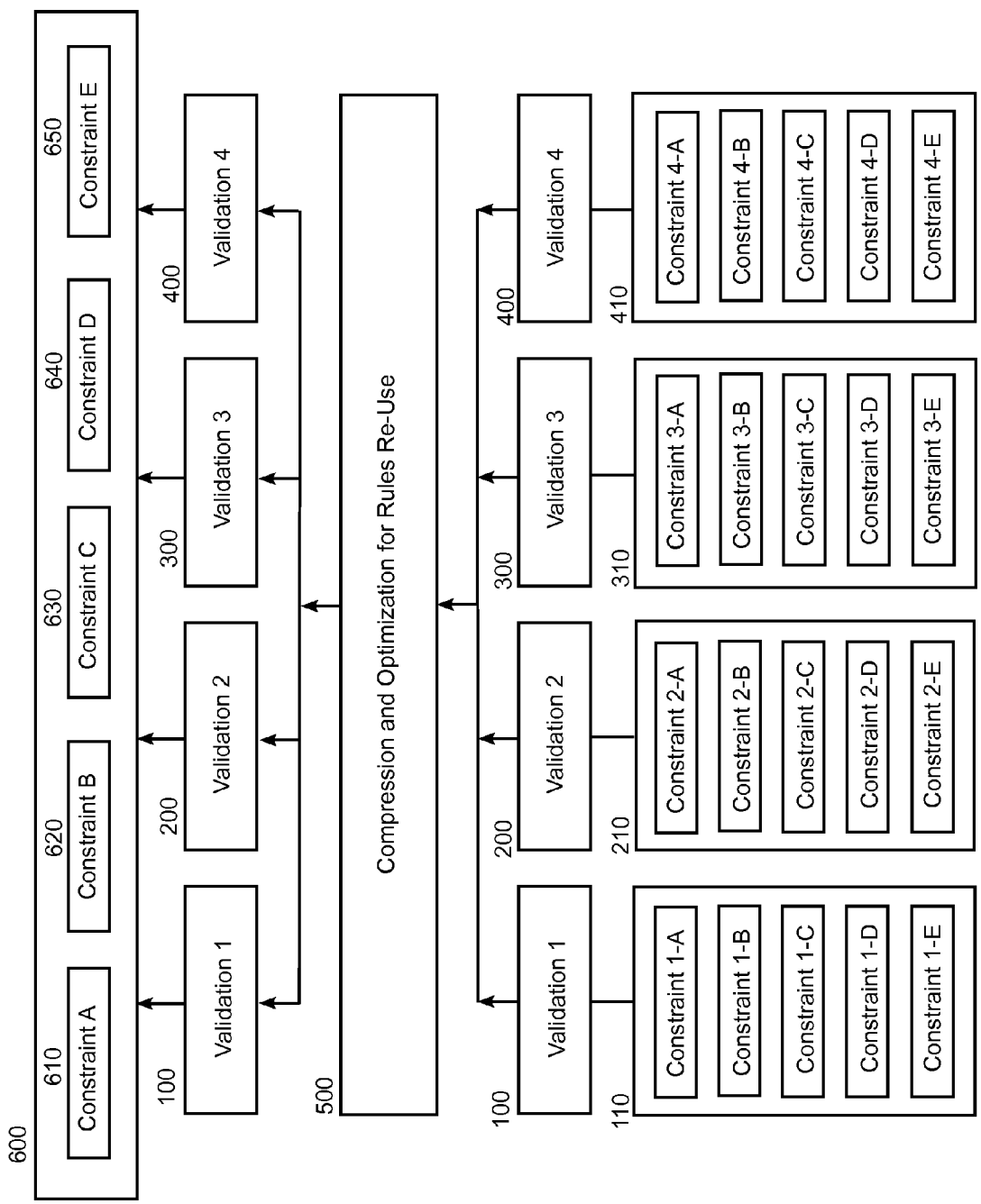
FIG. 1 is a diagram showing an exemplary methodology for compression and optimization of rules in a rules engine or a loyalty engine.

Ambrosia™ is an exemplary system for validation of transaction data using a rules engine and a loyalty engine. FIG. 1 presents a diagram of an exemplary process of compression and optimization for re-use of rules in Ambrosia™. Ambrosia™ includes various validations, such as validation 1 100, validation 2 200, validation 3 300, and validation 4 400. Each of the validations uses a set of constraints which are originally built. Validation 1 100 uses a constraints set 110 which includes constraints 1-A, 1-B, 1-C, 1-D, and 1-E. Validation 2 200 uses a constraints set 210 which includes constraints 2-A, 2-B, 2-C, 2-D, and 2-E. Validation 3 300 uses a constraints set 310 which includes constraints 3-A, 3-B, 3-C, 3-D, and 3-E. Validation 4 400 uses a constraints set 410 which includes constraints 4-A, 4-B, 4-C, 4-D, and 4-E. Through compression and optimization 500, constraints 1-A, 2-A, 3-A, and 4-A in the constraints sets (110, 210, 310, and 410) are put in constraint A 610, constraints 1-B, 2-B, 3-B, and 4-B in the constraints sets (110, 210, 310, and 410) are put in constraint B 620, and so on. After compression and optimization 500, the separate constraints sets (110, 210, 310, and 410) are combined into an aggregate of constraints 600. The aggregate of constraints 600 includes constraints A, B, C, D, and E (610, 620, 630, 640, 650, and 660), and is shared across several different validations (100, 200, 300, and 400) for any given transactions. The method of compression and optimization makes the whole of the generation of the rules engine feasible for commitment to a system's memory; therefore, the rules engine in the system's memory can be accessed substantially faster than a hard drive or a storage disk, and can easily service several millions of indexed items. The method of compression and optimization furnishes re-use of the constraints (or rules) in the Ambrosia™ system.

Figure 2:
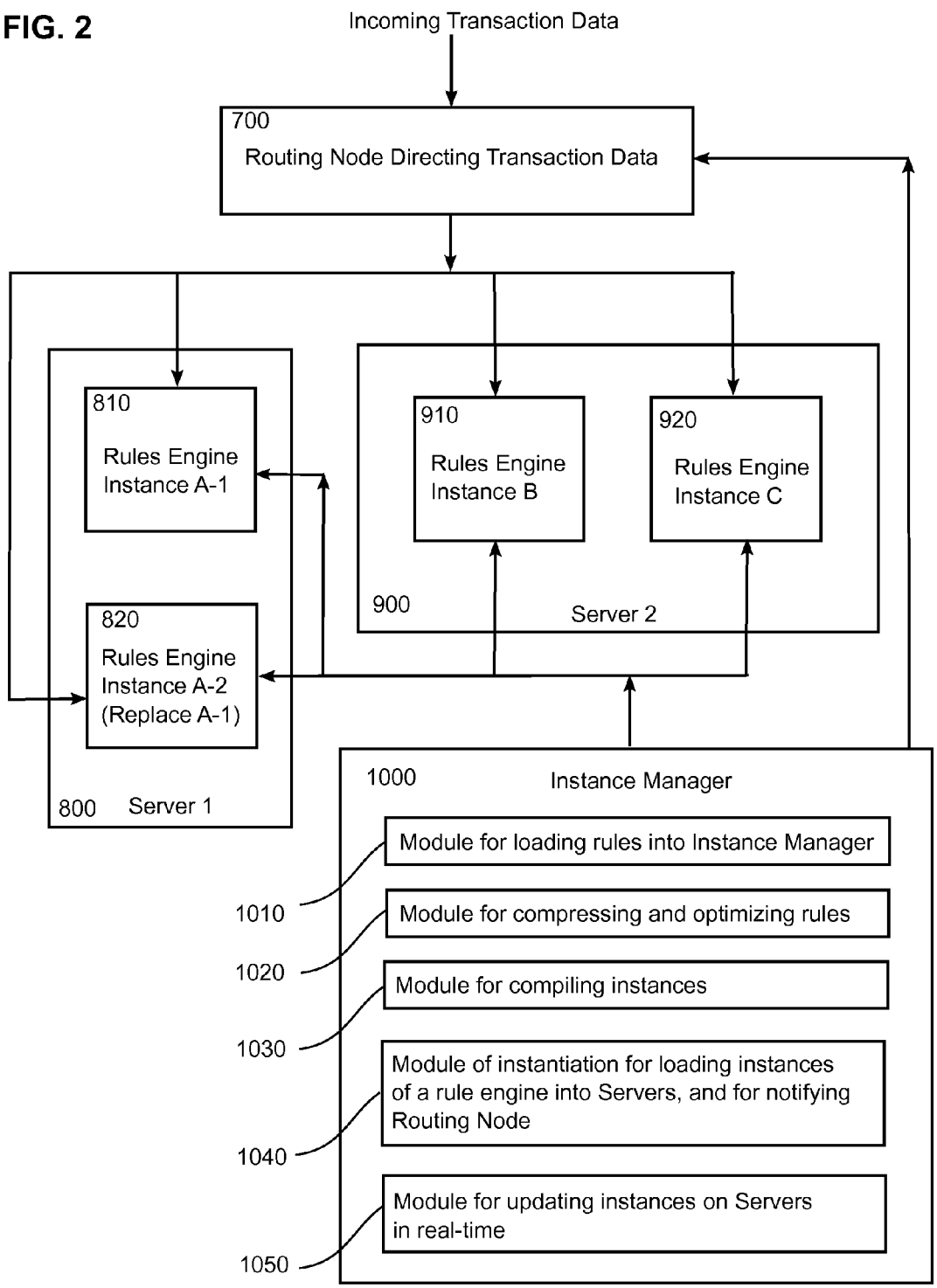
FIG. 2 is a diagram showing an exemplary system for validation of transaction data.

FIG. 2 presents a systematic illustration of an exemplary system for validation of transaction data. In FIG. 2, the exemplary system (Ambrosia™) includes multiple active instances of a rules engine. The exemplary system comprises a multi-threaded routing node 700 on a routing server for directing transaction data, server 1 800 comprising active rules engine instance A-1 810 and updated active rules engine instance A-2 820 for replacing active rules engine instance A-1 810, and server 2 900 comprising active rules engine instances B 910 and C 920. The exemplary system further comprises an instance manager 1000 on an administrative server. The instance manager 1000 comprises a rules preparation module 1010 for loading original rules from database into the instance manager 1000, a compressing and optimizing module 1020 for generating the aggregate of compressed rules from the original rules, a building module 1030 for compiling new packages of the multiple active instances of the rules engine, a module of instantiation 1040 for loading new packages of the multiple active instances into the servers (800, 900) and for notifying the routing node 700, and an updating module 1050 for managing real-time updates of active instances on the servers.

The system for validation of transaction data supports real-time updates in the environment of multiple active instances. Referring to FIG. 2, when the updated active instance A-2 820 is compressed and compiled, the active instance A-1 810 continues to service incoming requests for validation. When the updated active instance A-2 820 is ready for use, the routing node 700 is notified by the instance manager 1000 and begins sending transactions to the updated active instance A-2 820. At the same time, the active instance A-1 810 continues to service certain transactions until the updated instance A-2 820 is responsible for all transactions. Then, the active instance A-1 810 can be removed from server 1 800 by the updating module of the instance manager.

In one embodiment, the system for validation of transaction data includes both a rules engine and a loyalty engine. The multiple active instances of both the rules engine and the loyalty engine are loaded into a plurality of servers connected to a network.

In one embodiment, the system for validation of transaction data includes a loyalty engine. The multiple active instances of the loyalty engine are loaded into a plurality of servers connected to a network.

Figure 3:
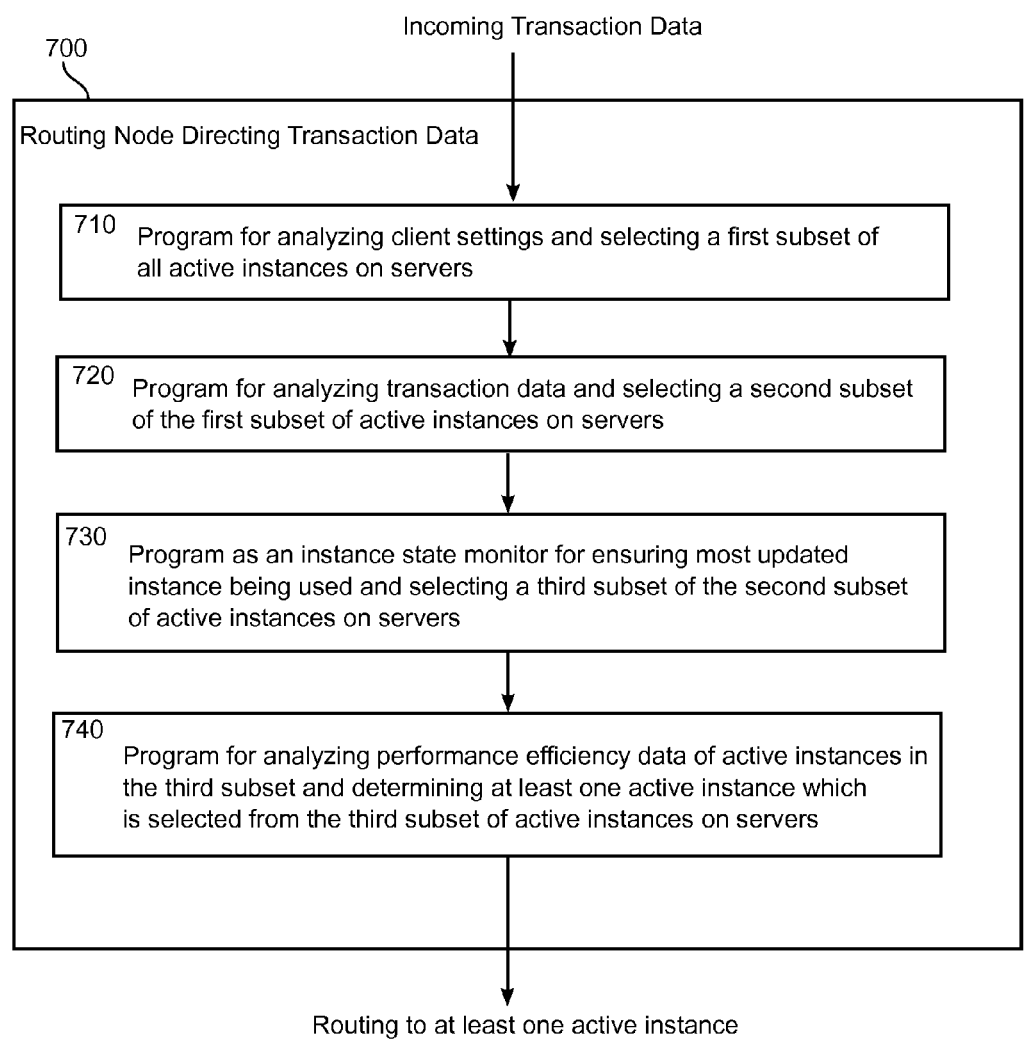
FIG. 3 is a diagram showing an exemplary routing node in a system for validation of transaction data.

FIG. 3 presents an exemplary multi-threaded routing node in a system for validation of transaction data. The multi-threaded routing node 700 receives transaction data and makes decisions on routing transaction data to different active instances on servers. The multi-threaded routing node 700 comprises a first program 710 for analyzing client settings and determining a first subset of all the active instances, a second program 720 for analyzing transaction data and determining a second subset of the first subset of the active instances, a third program 730 as an instance state monitor for ensuring that most updated instances are used and determining a third subset of the second subset of the active instances, and a fourth program 740 for analyzing performance efficiency data of the third subset of the active instances and determining at least one active instance which is selected from the third subset of the active instances. A purpose of analyzing performance efficiency data of the instances is to promote efficiency of each of instances. The transaction data is routed to the at least one active instance on the servers.

Although the present invention has been described in considerable detail with clear and concise language and with reference to certain preferred versions thereof including the best mode anticipated by the inventor, other versions are possible. Therefore, the spirit and scope of the invention should not be limited by the description of the preferred versions contained therein, but rather by the claims appended hereto.

What is claimed is:

1. A system for validation of transaction data, comprising:
   a validation engine comprising a plurality of active instances;
   a plurality of servers connected to a network, each of said servers hosting a predetermined number of said active instances;
   each of said active instances comprising a plurality of validation processes and a compressed rules aggregate shared thereby, operating in memory of at least one computing machine hosting at least one of said servers;
   at least one multi-threaded routing node for directing said transaction data to at least one of said active instances, said at least one multi-threaded routing node on at least one routing server connected to said network, said at least one multi-threaded routing node comprising: a first program for analyzing client settings and determining a first subset of said active instances, a second program for analyzing said transaction data and determining a second subset of said first subset, a third program as an instance state monitor for selecting updated ones of said active instances from said second subset so as to determine a third subset of said second subset, a fourth program for analyzing performance efficiency data of said active instances in said third subset and selecting said at least one of said active instances from said third subset; and
   at least one instance manager on at least one administrative server connected to said network, said at least one instance manager comprising: a rules preparation module for loading original rules from at least one database into said at least one instance manager, a compression and optimizing module for generating said compressed rules aggregate from said original rules, a building module for compiling new packages of said active instances, an instantiation module for loading said new packages into said servers and notifying said at least one multi-threaded routing node, an updating module for managing real-time updates of said active instances on said servers.

2. The system for validation of transaction data of claim 1, wherein said validation engine is a rules engine which is used to validate said transaction data and flag certain elements thereof.

3. The system for validation of transaction data of claim 1, wherein said validation engine is a loyalty engine which is used to validate said transaction data relating to entities submitting transactions.

4. The system for validation of transaction data of claim 1, wherein said validation engine comprises both a rules engine which is used to validate said transaction data and flag certain elements thereof and a loyalty engine which is used to validate said transaction data relating to entities submitting transactions.

5. The system for validation of transaction data of claim 3, wherein said loyalty engine further comprises an evaluation program using a measurement of second derivatives of transaction quantities with respect to time.

6. The system for validation of transaction data of claim 4, wherein said loyalty engine further comprises an evaluation program using a measurement of second derivatives of transaction quantities with respect to time.

7. A method for validation of transaction data, comprising:
   receiving a transaction from an originating system;
   routing said transaction data of said transaction by at least one multi-threaded routing node to at least one of active instances of a rules engine, steps comprising: (a) analyzing client settings and determining a first subset of said active instances of said rules engine, (b) analyzing said transaction data and determining a second subset of said first subset, (c) selecting updated ones of said active instances from said second subset so as to determine a third subset of said second subset, (d) analyzing performance efficiency data of said active instances in said third subset and selecting said at least one of said active instances from said third subset, and (e) routing said transaction data to said at least one of said active instances;
   validating said transaction data by said at least one of said active instances;
   flagging certain elements of said transaction data;
   sending validation data to said originating system;
   wherein said active instances are distributed on a plurality of servers connected to a network, and each of said servers hosts a predetermined number of said active instances;
   wherein each of said active instances comprises a plurality of validation processes and a compressed rules aggregate shared thereby, and operates in memory of at least one computing machine hosting at least one of said servers;
   wherein said at least one multi-threaded routing node is on at least one routing server connected to said network; and
   wherein said active instances of said rules engine are updated in real-time by an updating module of at least one instance manager on at least one administrative server connected to said network.

8. The method for validation of transaction data of claim 7, wherein a plurality of original rule sets built separately for each of said validation processes are loaded into said at least one instance manager by a rules preparation module thereof, and wherein said original rule sets are combined by a compressing and optimizing module of said at least one instance manager into said compressed rules aggregate which is shared across said validation processes.

9. The method for validation of transaction data of claim 7, a new active instance package is compiled by a building module of said at least one instance manager.

10. The method for validation of transaction data of claim 7, a new active instance package is loaded into said at least one of said servers and then said at least one multi-threaded routing node is notified by an instantiation module in said at least one instance manager.

11. The method for validation of transaction data of claim 7, wherein an outdated active instance version continues to service while an updated active instance version starts to service and until said updated active instance version fully replaces said outdated active instance version, and then said outdated active instance version is removed from said at least one of said servers.

12. A method for validation of transaction data, comprising:

receiving a transaction submitted by an entity from an originating system;

retrieving information of said entity from a loyalty engine;

routing said transaction data of said transaction by at least one multi-threaded routing node to at least one of active instances of said loyalty engine, steps comprising:

(a) analyzing client settings and determining a first subset of said active instances of said loyalty engine, (b) analyzing said transaction data and determining a second subset of said first subset, (c) selecting updated ones of said active instances from said second subset so as to determine a third subset of said second subset, (d) analyzing performance efficiency data of said active instances in said third subset and selecting said at least one of said active instances from said third subset, and (e) routing said transaction data to said at least one of said active instances;

validating said transaction data by said at least one of said active instances;

evaluating said transaction data by an evaluation program of said loyalty engine using a measurement of second derivatives of transaction quantities with respect to time;

saving validation data and evaluation data into said loyalty engine;

sending said validation data and said evaluation data to said originating system;

wherein said active instances are distributed on a plurality of servers connected to a network, and each of said servers hosts a predetermined number of said active instances;

wherein each of said active instances comprises a plurality of validation processes and a compressed rules aggregate shared thereby, and operates in memory of at least one computing machine hosting at least one of said servers;

wherein said at least one multi-threaded routing node is on at least one routing server connected to said network; and wherein said active instances of said loyalty engine are updated in real-time by an updating module of at least one instance manager on at least one administrative server connected to said network.

13. The method for validation of transaction data of claim 12, wherein a plurality of original rule sets built separately for each of said validation processes are loaded into said at least one instance manager by a rules preparation module thereof, and wherein said original rule sets are combined by a compressing and optimizing module of said at least one instance manager into said compressed rules aggregate which is shared across said validation processes.

14. The method for validation of transaction data of claim 12, a new active instance package is compiled by a building module of said at least one instance manager.

15. The method for validation of transaction data of claim 12, a new active instance package is loaded into said at least one of said servers and then said at least one multi-threaded routing node is notified by an instantiation module in said at least one instance manager.

16. The method for validation of transaction data of claim 12, wherein an outdated active instance version continues to service while an updated active instance version starts to service and until said updated active instance version fully replaces said outdated active instance version, and then said outdated active instance version is removed from said at least one of said servers.

* * * * *